_United States Patent Office_

3,399,169
Patented Aug. 27, 1968

3,399,169
**2 - HYDROXY - 4 - ALKOXY - 4' - ALKYLBENZO-
PHENONES AND POLYMERS STABILIZED
THEREWITH**
Robert Louis Horton, Bound Brook, N.J., assignor to
American Cyanamid Company, Stamford, Conn., a corporation of Maine
No Drawing. Filed May 5, 1966, Ser. No. 547,736
3 Claims. (Cl. 260—45.95)

ABSTRACT OF THE DISCLOSURE

A polyolefinic composition having improved stability to light comprising a polymer of an olefin of 2–4 carbons and 0.1 to 5.0% of a compound of the formula:

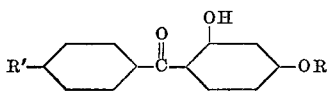

wherein R is an alkyl radical of 12–22 carbons and R' is an alkyl radical of 4–10 carbons.

---

This invention relates to the provision of new hydroxybenzophenones. It relates further to the use of these hydroxybenzophenones as light stabilizers for polyolefins.

It is known that hydroxybenzophenones are a generally useful class of stabilizers for plastics of the polyolefinic type. One of the requirements for a good stabilizer for polyolefins is the durability of the stabilizer to high temperature conditions; that is, the stabilizer must be able to withstand heat without being degraded, and also it must be of sufficiently low volatility to resist evaporation at the high temperatures normally encountered in the processing of polyolefins. This requirement is especially pronounced in the case of polypropylene since this material is processed at temperatures normally around 300° C. Another property which a good stabilizer must have is resistance to leaching out by solvents or liquids which the plastic substrate will encounter during use. Plastics, such as polyolefins, since they are currently being spun into fibers, often contact detergents and bleaches used in home laundering operations. It is therefore important that the stabilizer should be able to resist leaching out under such conditions.

While known hydroxybenzophenones have been capable of satisfying the standards for good stabilizers in polyolefins, there still remains a need for stabilizers which are improved in ability to withstand high temperatures and extraction by detergent solutions.

It is an object of the present invention to provide a class of stabilizers which are capable of stabilizing polyolefins even after exposure to high temperature conditions and even after exposure to detergent solutions. Other objects will become apparent from the ensuing description of the present invention.

In accordance with the present invention, it has been discovered that certain 2-hydroxy-4-alkoxy-4'-alkylbenzophenones are excellent stabilizers for polyolefins. These benzophenones may be represented by the following formula:

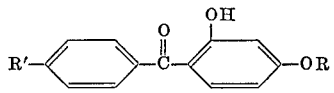

wherein R is an alkyl group of 12–22 carbons and R' is an alkyl group of 4–10 carbons.

The compounds of Formula I are conveniently prepared by alkylation of 4'-alkyl-2,4-dihydroxybenzophenones, the latter intermediates being obtainable by the reaction of p-alkylbenzoyl chloride with resorcinol in the presence of a Friedel-Crafts catalyst and a solvent such as chlorobenzene. The alkylation leading to the compounds of the present invention is conveniently effected with an alkyl bromide of 12–22 carbons. The reaction may be carried out in an aqueous solvent and in the presence of an acid acceptor such as sodium carbonate.

The stabilizers of Formula I are particularly effective for the stabilization of polyolefins such as polyethylene, polypropylene, polybutylene and various copolymers of ethylene, propylene and butylene. However, they may also be used in other polymers such as polyvinylchloride, the superpolyamides, polycarbonates, polyformaldehyde, and the polymeric fluoro carbons.

The compounds of Formula I are incorporated into the polymer in concentrations of 0.1% to 5% by weight of the polymer. Within this range of concentrations, it is generally found that good stability can be obtained if from 0.2% to 2.0% is used.

The present invention is further illustrated by the following examples in which parts and percentages are on a weight basis.

EXAMPLE 1

Preparation of p-t-butylbenzoyl chloride intermediate

A mixture of 106.8 parts of (0.6 mole) of p-t-butylbenzoic acid and 85.7 parts (0.72 mole) of thionyl chloride was refluxed for one hour. The reaction mixture was then stripped of excess thionyl chloride at reduced pressure. A liquid product was obtained.

EXAMLE 2

Preparation of 4'-t-butyl-2,4-dihydroxybenzophenone intermediate

To a mixture of 79.2 parts (0.72 mole) of resorcinol and 96 parts of aluminum chloride in 400 parts of chlorobenzene at room temperature was added dropwise 117.5 parts (0.6 mole) of p-t-butylbenzoyl chloride over about a 30 minute period during which time the temperature rose to 42° C. The mixture was then gradually heated to 90° C. over a one-hour period and maintained at this temperature for two hours.

The mixture was then drowned, with stirring, in 2,000 parts of ice water and 140 parts of concentrated hydrochloric acid and allowed to stand for about 72 hours.

The solid which had crystallized out of the chlorobenzene layer was washed with water and dried at 60° C. There was obtained 141 parts, 85% yield, of a product melting at 163–165° C. which upon recrystallization from benzene melted at 168–169° C.

EXAMPLE 3

Preparation of 4'-t-butyl-2-hydroxy-4-dodecyloxybenzophenone

A mixture of 85.0 parts (0.33 mole) of 4'-t-butyl-2,4-dihydroxybenzophenone, 46.5 parts of sodium carbonate and 99.6 parts (0.4 mole) of dodecyl bromide in 100 parts of water and 200 parts of ethanol was refluxed for about 72 hours.

The mixture was then brought to 1,500 parts total with water and sodium carbonate was added. The oil which separated was extracted with ether and the ether solution dried over sodium sulfate. After removal of the ether, a solid of melting point 36.5–37.0° C. was obtained.

EXAMPLE 4

Preparation of 4'-t-butyl-2-hydroxy-4-hexadecyloxybenzophenone

Following the procedure of Example 3, but substituting 122 parts of hexadecyl bromide for the dodecyl bromide therein, there was obtained a product of melting point 31.5–32.0° C.

EXAMPLE 5

This example is presented to show the resistance of the compounds of the present invention to high temperatures encountered during the processing of polyolefins. As compared to known stabilizers, the compounds of the present invention resist volatilization at high processing temperatures and, thus, are capable of continuing to provide stability even after exposure to such high temperatures.

Four compounds representing the present invention and the prior art were thermogravimetrically analyzed to determine the temperature at which 10% of the test compound was lost ($T_{10}$). The results are presented in the following table wherein R' and R correspond to the substituents in Formula I. In each thermogravimetric analysis, the rate of temperature rise is 10°/minute.

TABLE I.—THERMOGRAVIMETRIC DATA

| No. | R' | R | $T_{10}$ (° C.) |
|---|---|---|---|
| 1 | H | $C_8H_{17}$ | 276 |
| 2 | t-$C_4H_9$ | $C_8H_{17}$ | 303 |
| 3 | t-$C_4H_9$ | $C_{12}H_{25}$ | 323 |
| 4 | t-$C_4H_9$ | $C_{16}H_{33}$ | 310 |

These data indicate that Compounds 1 and 2 of the prior art are subject to loss at considerably lower temperatures than Compounds 3 and 4 of the present invention.

EXAMPLE 6

This example is presented to illustrate the resistance to leaching out by detergent solutions possessed by the compounds of the present invention.

Samples of the compounds of this invention as well as certain of the known ultraviolet absorbers were incorporated into unstabilized polypropylene by milling and molding using standard procedures. Films of 5 mil thickness were obtained which were refluxed in 250 ml. of aqueous solution containing 0.2% Tide detergent and 0.4% of a standard 5% sodium hypochlorite solution for 20 hours. The film samples were removed, rinsed with distilled water and dried at room temperature.

The percent of light stabilizer present was determined before and after extraction by U.V. spectrophotometric analyses. The samples were exposed after extraction to ultraviolet light in a Fluorescent Sunlamp-Black Light Unit (FS–BL unit) and the percent carbonyl formation determined after various hours of exposure. The various results are summarized in Table II.

TABLE II.—EXTRACTION AND EXPOSURE DATA ON POLYPROPYLENE FILMS CONTAINING 0.25% ADDITIVE

| No. | R | R' | Percent remaining after extraction | Percent carbonyl formation (hours of exposure) | | |
|---|---|---|---|---|---|---|
| | | | | 100 | 150 | 350 |
| 1 | $C_8H_{17}$ | H | 11.7 | 0.03 | 0.056 | 0.401 |
| 2 | $C_8H_{17}$ | (t)$C_4H_9$ | 19.5 | 0.011 | 0.024 | 0.230 |
| 3 | $C_{12}H_{25}$ | (t)$C_4H_9$ | 87.1 | 0.013 | 0.018 | 0.033 |
| 4 | $C_{16}H_{33}$ | (t)$C_4H_9$ | 85.4 | 0.014 | 0.025 | 0.071 |
| 5 | Control (no U.V. absorber) | | | 0.05 | | |

The foregoing table indicates that Compounds 1 and 2 of the prior art were very prone to extraction by the detergent solution and, after the plastic substrate in which they were incorporated had been extracted by the detergent solution, the substrate was very sensitive to light degradation. Compounds 3 and 4 of the present invention were very resistant to extraction by detergent solutions. The plastic samples having the compounds of the present invention had a high degree of light stability even after prolonged contact with detergent solutions.

I claim:

1. A polyolefinic composition having improved stability to light comprising a polymer of an olefin of 2–4 carbons and 0.1 to 5.0% of a compound of the formula:

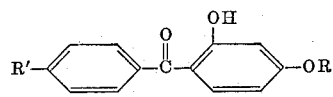

wherein R is an alkyl radical of 12–22 carbons and R' is an alkyl radical of 4–10 carbons.

2. The composition in claim 1 wherein the polyolefin is polypropylene.

3. The composition of claim 1 wherein R is dodecyl and R' is butyl.

References Cited

UNITED STATES PATENTS

| 3,006,959 | 10/1961 | Armitage et al. | 260—45.95 |
| 3,049,443 | 8/1962 | Coleman | 260—45.95 |
| 3,188,298 | 6/1965 | Williamson et al. | 260—45.95 |

FOREIGN PATENTS

| 789,070 | 1/1958 | Great Britain. |

DONALD E. CZAJA, *Primary Examiner.*

H. E. TAYLOR, *Assistant Examiner.*